Patented May 1, 1928.

1,668,235

UNITED STATES PATENT OFFICE.

HARRY L. FISHER, OF LEONIA, NEW JERSEY, ASSIGNOR TO THE B. F. GOODRICH COMPANY, OF NEW YORK, N. Y., A CORPORATION OF NEW YORK.

RUBBER COMPOSITION AND METHOD OF PRODUCING THE SAME.

No Drawing. Application filed January 14, 1924, Serial No. 686,202. Renewed March 14, 1928.

This invention relates to compositions of matter made from or containing rubber, this application being a continuation in part of my copending application, Serial No. 616,178, filed January 31, 1923, on rubber composition and method of producing the same.

My general object is to provide a new and improved class of rubber derivatives or compounds having certain desirable properties adapting them for various uses. A more specific object is to provide inexpensive, heat-plastic or mouldable derivatives of rubber suitable for uses similar to those of bakelite, shellac, balata or gutta-percha, and particularly derivatives suitable for use as constituents of phonograph records, electrical insulations, and various molded goods. A further object is to provide a novel method of vulcanizing or otherwise changing rubber into a durable composition suitable for use in the arts.

I find that by mixing rubber with an organic sulfonic acid and heating the mixture, I am able to obtain (a) products which are resilient or elastic, similar in many respects to ordinary, soft, vulcanized rubber; (b) hard, tough, heat-plastic products similar to balata and suitable for many uses similar to those of balata; or (c) hard, brittle products which soften or fuse at low temperatures and which are similar in properties to shellac, for which they may be substituted in many compositions such as those of phonograph records, molded electrical insulators, or the like.

As an example of the preparation of the elastic product, I mix 4 to 5 parts by weight of p-toluene sulfonic acid into 100 parts by weight of crude rubber. This may be accomplished on a rubber mill or in any other suitable manner. This mixture is sheeted or otherwise formed, and is then heated for 20 to 40 hours at 120° C. The product is resilient, slightly elastic, and non-thermoplastic. When such heating is effected in air the product has a thin surface coat of oxidized material.

As an example of the tough, heat-plastic, balata-like product, 10 parts of p-toluene sulfonic acid are mixed with 100 parts of rubber. Thin slabs of the mix, preferably not more than about ½ inch in thickness, are dusted with soapstone or other powder to prevent sticking, and heated in an oven for 48 hours at 110° C., followed by 48 hours at 120° C. Alternatively the mix may be heated in a mold or other suitable retainer to a temperature of 175° C. for 3-6 hours or at 150° C. for about 12 hours. Cooling under pressure may be employed to prevent porosity and to facilitate removal from the mold. The product is hard and tough and somewhat similar to balata. It is thermoplastic and may be homogenized by milling on steam-heated rolls. It is necessary, for the balata-like product, that the original mix be first heated at a low temperature, preferably about 110° C., and that the slabs be prepared sufficiently thin so that the heat developed within the mass is carried off and does not cause a rise in temperature within the material substantially higher than the temperature of the oven, as such increase in temperature produces the shellac type of product as described in the following example. After the exothermic reaction has subsided, higher temperatures are used to complete the reaction and to produce the desired physical properties.

As an example of the third or shellac type of product, I place large masses of the above described mixture of rubber and organic sulfonic acid in a container and heat for 3 to 4 hours at 130° C. After about one hour the temperature within the mass rises to 200–240° C. or higher, the mass melts and bubbles of gas are given off. The weight loss may be 3 to 4% or higher. This method of heating leaves a superficial layer of the balata-like product surrounding the fused material, apparently due to radiation of heat. This may be avoided by heating the mass at the beginning to 200–210° C. for a shorter period of time.

The fusible, hard, brittle, shellac-like product dissolves to a coloidal solution in benzene, p-cymene, gasoline, turpentine, "tetralin", "decalin", chloroform, carbon tetrachloride, carbon bisulfide and molten camphor, but is practically insoluble in alcohol, ether, acetone, glacial acetic acid, amylacetate, aniline, water, dilute acids and alkalies. When its solutions are filtered to remove small amounts of impurities and the filtrate poured into alcohol, acetone or similar liquid, there is precipitated a whitish powder having all the properties of the original material and which on fusing gives an amber-colored, translucent product which has practically no sulfur content. This product softens at 90–100° C., slowly melts at 110–120° C., and is completely fused at 125–130° C. such graduation of softening under heat making it similar to shellac and making it exceptionally valuable for uses similar to those of shellac. Inert fillers may be admixed either before or after the heat treatment. Such pigments as zinc oxide, which react with sulfonic acids, may be admixed after the reaction is completed. The shellac-like product may be hot-molded with a high polish and is stable under atmospheric conditions. It is slowly attacked by concentrated sulfuric acid and is nitrated by strong nitric acid similarly to the original rubber from which it was prepared.

The products above described possess exceptional dielectric properties, wherefore my invention provides a new group of compositions, of value for the several uses above described as well as other uses which will occur to those skilled in the art.

It will be understood that the physical properties of my products may be varied by the proportions of the ingredients and the conditions of time or temperature employed in their preparation, wherefore I do not wholly limit my claims to the exact proportions or procedures described herein. For example, if a mixture of 7 parts by weight of p-toluene sulfonic acid and 100 parts of rubber, is heated in a large mass, for 6 hours at 141° C., whereby the exothermic reaction causes the temperature of the mass to rise substantially above that of the oven, there is produced a product which is less brittle than the shellac-like product described above and more heat-plastic than the balata-like product. Moreover, I do not wholly limit my claims to the use of plantation rubbers, since I may also use wild or synthetic rubbers, or similar substances, as equivalents.

I claim:

1. The method of producing a rubber composition which comprises reacting crude rubber with p-toluene sulfonic acid.

2. The method of producing a rubber composition which comprises mixing p-toluene sulfonic acid into rubber, and heating the resulting mix to a reaction temperature.

3. The method of producing a rubber composition which comprises mixing p-toluene sulfonic acid into rubber, and heating the resulting mixture sufficiently to produce therein a vigorous exothermic reaction.

4. The method of treating rubber which comprises effecting an exothermic reaction between a mass of raw rubber and p-toluene sulfonic acid distributed throughout the mass, to the extent of converting it into a product having greater rigidity at normal temperatures and increased thermoplastic properties at moderately high temperatures.

5. The method of treating rubber which comprises effecting an exothermic reaction between a mass of raw rubber and p-toluene sulfonic acid distributed throughout the mass, to the extent of converting it into a coherent, hard, friable thermoplastic product.

6. As a new composition of matter, the reaction product of rubber and p-toluene sulfonic acid.

7. As a new composition of matter, the exothermic reaction product of rubber and p-toluene sulfonic acid.

8. As a new composition of matter, the hard, brittle, thermoplastic reaction product of rubber and p-toluene sulfonic acid.

In witness whereof I have hereunto set my hand this 11th day of January, 1924.

HARRY L. FISHER.